Oct. 13, 1964 J. F. BLOKKER 3,153,199
CIRCUIT PRODUCING POSITIVE OR NEGATIVE PULSES WITH RESPECT TO COMMON REFERENCE, EMPLOYING MAGNETICALLY-COUPLED FLUX-OPPOSING ELEMENTS
Filed Feb. 28, 1963
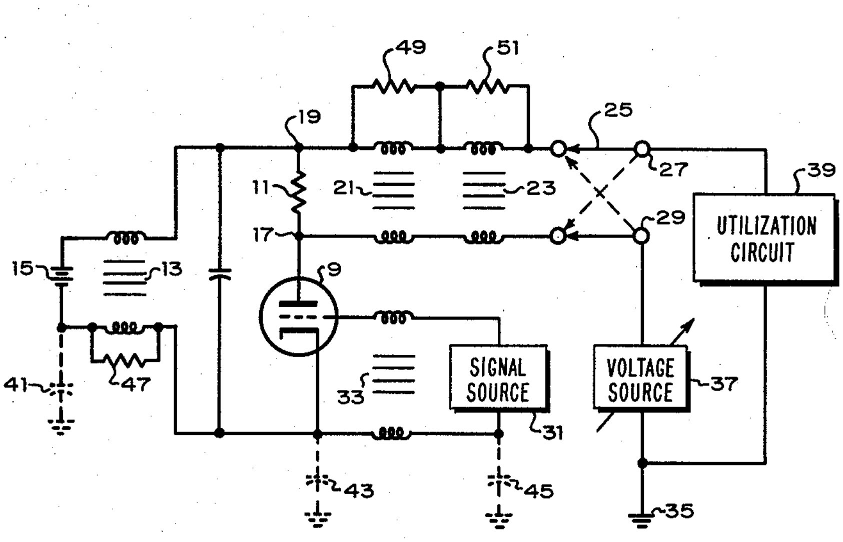
INVENTOR
JOHAN F. BLOKKER
BY Albert C. Smith
AGENT 3,153,199

CIRCUIT PRODUCING POSITIVE OR NEGATIVE PULSES WITH RESPECT TO COMMON REFERENCE, EMPLOYING MAGNETICALLY-COUPLED FLUX-OPPOSING ELEMENTS

Johan F. Blokker, Palo Alto, Calif., assignor to Hewlett-Packard Company, Palo Alto, Calif., a corporation of California Filed Feb. 28, 1963, Ser. No. 261,804
7 Claims. (Cl. 328—34)

This invention relates to a pulse circuit which delivers output pulses of positive or negative polarity with rise and fall times of the order of two nanoseconds.

Certain known pulse generators derive negative polarity pulses from the plate circuit of an output stage and derive positive polarity pulses from the cathode circuit of the stage. This is done to avoid the difficulties which are encountered in attempting to derive pulses of either polarity from the signal appearing across the plate load of such an output stage merely by shifting the reference for the pulses from one terminal of the plate load to the other terminal. However, deriving the output pulses of opposite polarity from two different circuits in the output stage frequently creates voltage reference problems, particularly where pulses from a number of such generators are required to be combined.

Accordingly it is an object of the present invention to provide a pulse circuit which produces pulses having either positive or negative polarity with respect to a a common reference.

It is another object of the present invention to provide an improved pulse circuit.

In accordance with a preferred embodiment of the present invention a pulse amplifier and power supply therefor are isolated from the ground reference. The pulse signal source and the output pulse circuitry are isolated from the ground reference so that a pulse produced at the output may have either a positive or negative polarity merely by shifting the output terminal which is connected to the ground reference. Inductive isolators are provided throughout the circuit to minimize the effect upon the rise and fall times of the output pulse of the distributed capacity which exists between the floating amplifier circuitry and the ground reference.

Other and incidental objects of the present invention will be apparent from a reading of this specification and an inspection of the accompanying drawing which shows a schematic diagram of the circuit of the present invention.

Referring now to the drawing there is shown an amplifier 9 with a plate load 11 which is connected through transformer 13 to the bias supply 15. Each of the end terminals 17 and 19 of the plate load 11 is connected through the serially connected windings of the transformers 21 and 23 and through polarity switch 25 to output terminals 27 and 29. A signal source is connected to the input circuit of amplifier 9 through the windings of transformer 33. All of this circuitry is isolated from the ground reference 35. An optional connection to the ground reference may be made through variable voltage source 37. Utilization circuit 39 is connected between an output terminal 27 and the ground reference 35. The distributed capacitance which exists between the ground reference 35 and each of the bias supply 15, amplifier 9 and signal source 31 are shown as lumped distributed capacitances 41, 43 and 45, respectively. These capacitances exist in practice because of the isolation of the circuit elements from ground reference and because these elements are operated at a different potential than the ground reference 35. The transformer 13 comprises a pair of tightly-coupled bifilar-wound windings which are critically damped by resistor 47.

Transformer 33 is similar to the transformer 13 with the damping resistor omitted for practical reasons. Transformers 21 and 23 each comprise a coaxial cable wound about a core of magnetic material. These transformers appear as a pair of serially connected elements rather than as a single element so that more effective critical damping may be achieved using resistors 49 and 51.

In a conventional circuit, a bias supply for an amplifier stage is connected to a ground reference and thus one of the terminals of the plate load for the amplifier is effectively connected to the ground reference for varying signal. A negative output pulse with respect to the ground reference may easily be produced in this type conventional circuit by varying the signal on the other of the terminals of the plate load in response to the change in conductivity of the amplifier. However, a positive pulse cannot be obtained conveniently in the conventional circuit merely by interchanging which of the load terminals is effectively connected to the ground reference. By isolating the circuitry from the ground reference 35 according to the present invention this simple interchange of load terminals may be used to produce both positive and negative output pulses. Although the bias supply 15 is isolated from the ground reference 35, there exists distributed capacitance between the circuit elements of the bias supply and the ground reference as shown by the lumped capacitance 41. In effect, this connects the terminal 19 of plate load 11 to ground reference 35 for varying signals. When polarity switch 25 is set in the alternate position, the negative-going signal which appears at terminal 17 of the plate load as the conductivity of amplifier 9 is increased appears as a negative-going pulse at output terminals 27 and 29 with respect to terminal 19 and hence, with respect to the ground reference 35. When polarity switch 25 is set in the position shown, the signal at terminal 17 remains fixed with respect to the ground reference 35 and the varying signal appears at terminal 19 of the plate load. As a result, the signal voltage on the bias supply 15 and its associated distributed capacitance 41, on the cathode circuit of amplifier 9 and its associated distributed capacitance 43 and on the signal source 31 and its distributed capacitance 45 must all be varied relative to the ground reference 35 with the rise or fall time of the output pulse. This requires high charging current and hence the rise and fall times of the output pulse are degraded by the distributed capacitances 41, 43 and 45 which are required to be charged. For this reason, conventional pulse circuits are connected to produce the positive polarity output pulse from the cathode circuit. Instead, the present invention uses the magnetic isolators or transformers 13, 21, 23 and 33 to minimize the currents which charge distributed capacitances 41, 43 and 45, thereby maintaining the fast rise and fall time of the positive output pulse. The increased current flowing in one set of serially connected windings of transformers 21 and 23 due to the increased signal appearing across the plate load 11 causes a current to flow in the opposite direction in the other windings of the transformers as a result of the tight magnetic coupling which exists between the pairs of windings. Since these currents are substantially equal and opposite in direction, they are forced to flow almost entirely in the utilization circuit 39. Only a minimum amount of current remains which can flow in the ground reference 35 and back through the distributed capacitances 41, 43 and 45. To reduce further the charging currents which flow in the distributed capacitances, the isolator or transformer 13 is connected in the power supply circuit and the isolator or transformer 33 is connected in the signal circuit. These transformers increase the impedance of the signal paths for charging current flowing in the distributed capacitances and thus further improve the rise and fall times of the positive output pulse. Since these transformers introduce only negligible signal delay from one end terminal to the other end terminal of each winding, they may be critically damped using a resistor, 47, 49, 51 of selected value, thereby further improving the shape of the output pulse.

A variable voltage source 37 having negligible internal impedance may be connected between an output terminal 29 and the ground reference 35. This may be set to provide a base or reference voltage above or below which the output pulses may vary. Also, this voltage source permits variation of the output pulse duty cycle from the smallest value substantially to 100 percent value with the output stage operating to 50 percent value. This may be accomplished by providing output pulses at one polarity and having a duty cycle which is selected between the smallest value and 50 percent and then by reversing the pulse polarity using switch 25 and by setting the voltage source 37 to the amplitude of the pulses of the first polarity. In this manner, a pulse is provided between terminals 27 and the ground reference 35 which increases in duty cycle from 50 percent substantially to 100 percent as the duty cycle in the output stage decreases from 50 percent to the smallest value. The overall effect is a variation in the duty cycle of output pulses having a selected polarity from the smallest value substantially to 100 percent.

I claim:

1. A pulse circuit comprising:
an amplifier having an output and an input connected to receive a control signal;
a power supply connected to said amplifier for supplying bias thereto;
a source of reference potential;
said amplifier and power supply being isolated from said source of reference potential for unidirectional signals and showing distributed capacitance to said source of reference potential for varying signals;
a load for said amplifier having end terminals and being connected to the output of said amplifier;
a pair of circuit elements, each having end terminals and each having inductive reactance, the pair of circuit elements being magnetically coupled together in flux-opposing relationship for signal currents flowing through one of said circuit elements in a direction toward one end terminal thereof and flowing through the other of said circuit elements in a direction away from the corresponding end terminal thereof, said circuit elements showing negligible delay of signal between the end terminals thereof;
means connecting the corresponding end terminals of said circuit elements to the end terminals of said load;
a utilization circuit; and
circuit means connecting said utilization circuit to the other end terminals of said circuit elements.

2. A pulse circuit as in claim 1 wherein:
said circuit means includes a two-position switch which provides first and second circuits in response to actuation of the switch in each of its two positions;
means including the first circuit of said switch and connecting said other end terminals of said circuit elements to said utilization circuit with one relative polarity; and
means including the second circuit of said switch and connecting said other end terminals of said circuit elements to said utilization circuit with the opposite relative polarity.

3. A pulse circuit comprising:
an amplifier having an output and an input connected to receive a control signal;
a power supply having output terminals for supplying bias to said amplifier;
a source of reference potential;

said amplifier and power supply being isolated from said source of reference potential for unidirectional signals and showing distributed capacitance to said source of reference potential for varying signals;
first and second pairs of circuit elements, each having end terminals and having inductive reactance, the circuit elements in each of the pairs being magnetically coupled together in flux-opposing relationship for signal currents flowing through one circuit element toward an end terminal thereof and flowing through the other circuit element away from the corresponding end terminal thereof, the circuit elements showing negligible delay of signal between the end terminals thereof;
means connecting the corresponding end terminals of said circuit elements in the first pair to the output terminals of said power supply;
a load for said amplifier;
means including said load and connecting the other end terminals of said first pair of circuit elements to the output of said amplifier for supplying operating bias thereto;
means connecting the corresponding end terminals of said circuit elements in the second pair to the end terminals of said load;
a utilization circuit; and
means connecting said utilization circuit to the other end terminals of said circuit elements in the second pair.

4. A pulse circuit comprising:
an amplifier having an input and output and a power supply having end terminals for supplying bias thereto;
a source of reference potential;
said amplifier and power supply being isolated from said source of reference potential for unidirectional signals and showing distributed capacitance to said source of reference potential for varying signals;
a load for said amplifier connected to the output of said amplifier;
first, second and third pairs of circuit elements, each having end terminals and having inductive reactance, the circuit elements in each of said pairs being magnetically coupled together in flux-opposing relationship for signal currents flowing through one circuit element toward an end terminal thereof and flowing through the other circuit element away from the corresponding end terminal thereof, the circuit elements showing negligible delay of signal between end terminals thereof;
means connecting the corresponding end terminals of said circuit elements in the first pair to the end terminals of said power supply;
means including said load and connecting the other end terminals of said first pair of circuit elements to said amplifier for supplying operating bias thereto;
means connecting the corresponding end terminals of said circuit elements in the second pair to the end terminals of said load;
a utilization circuit;
means connecting said utilization circuit to the other end terminals of said circuit elements in the second pair;
a signal source;
means connecting said signal source to the corresponding end terminals of said third pair of circuit elements; and
means connecting the other end terminals of said third pair of circuit elements to the input of said amplifier.

5. A pulse circuit comprising:
an amplifier having an output and an input connected to receive a control signal;
a power supply connected to said amplifier for supplying bias thereto;
a source of reference potential;

said amplifier and power supply being isolated from said source of reference potential for unidirectional signals and showing distributed capacitance to said source of reference potential for varying signals;

a load for said amplifier having end terminals and being connected to the output of said amplifier;

a pair of conductors wound about a core of magnetic material to form windings, said windings being magnetically coupled together in flux-opposing relationship for signal currents flowing through one of said conductors in a direction toward an end thereof and flowing through the other of said conductors in a direction away from a corresponding end thereof, said conductors showing negligible delay of signal between ends thereof;

means connecting the corresponding ends of said conductors to the end terminals of said load;

a utilization circuit; and means connecting said utilization circuit to the other ends of said conductors.

6. A pulse circuit comprising:

an amplifier having an output and an input connected to receive a control signal;

a power supply connected to said amplifier for supplying bias thereto;

a source of reference potential;

said amplifier and power supply being isolated from said source of reference potential for unidirectional signals and showing distributed capacitance to said source of reference potential for varying signals;

a load for said amplifier having end terminals and being connected to the output of said amplifier;

a coaxial cable having inner and outer conductors and having a portion thereof wound about a core of magnetic material to form windings which are magnetically coupled together in flux-opposing relationship for signal currents flowing through one of said conductors in a direction toward an end thereof and flowing through the other of said conductors, in a direction away from a corresponding end thereof, said conductors showing negligible delay of signal between ends thereof;

a resistor having end terminals, one of the end terminals of said resistor being connected to said outer conductor near one end of said portion thereof which is wound about said core and the other end terminal of said resistor being connected to said outer conductor near the other end of said portion thereof which is wound about said core;

means connecting the corresponding ends of said conductors to the end terminals of said load;

a utilization circuit; and means connecting said utilization circuit to the other ends of said conductors:

7. A pulse circuit as in claim 5 wherein said conductors are bifilar wound about said core.

References Cited by the Examiner

UNITED STATES PATENTS

| | | | |
|---|---|---|---|
| 1,840,776 | 1/32 | Houck | 328—263 |
| 1,853,217 | 4/32 | Miessner | 328—263 |

ARTHUR GAUSS, *Primary Examiner.*